(12) United States Patent
Barrenscheen (10) Patent No.: US 10,447,461 B2
(45) Date of Patent: Oct. 15, 2019

(54) ACCESSING DATA VIA DIFFERENT CLOCKS

(71) Applicant: Infineon Technologies Austria AG, Villach (AT)

(72) Inventor: Jens Barrenscheen, Munich (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 242 days.

(21) Appl. No.: 14/956,222

(22) Filed: Dec. 1, 2015

(65) Prior Publication Data
US 2017/0155497 A1    Jun. 1, 2017

(51) Int. Cl.
| | | |
|---|---|---|
| G04C 13/04 | (2006.01) |
| H04L 7/00 | (2006.01) |
| G06F 1/12 | (2006.01) |
| G06F 1/3237 | (2019.01) |
| G06F 1/324 | (2019.01) |

(52) U.S. Cl.
CPC .............. *H04L 7/0008* (2013.01); *G06F 1/12* (2013.01); *G06F 1/324* (2013.01); *G06F 1/3237* (2013.01); *H04L 7/0012* (2013.01); *H04L 7/0087* (2013.01); *Y02D 10/126* (2018.01); *Y02D 10/128* (2018.01)

(58) Field of Classification Search
CPC ........ H04J 3/076; H04J 3/0632; H04J 3/0626; H04J 3/062; H04L 25/05
USPC .................................................. 375/354–376
See application file for complete search history.

(56) References Cited

U.S. PATENT DOCUMENTS

| | | | | |
|---|---|---|---|---|
| 3,801,795 A * | 4/1974 | Zajac | ................. | G04C 13/0409 307/66 |
| 4,254,492 A * | 3/1981 | McDermott, III | ......................... | G04C 13/0409 331/49 |
| 4,556,952 A * | 12/1985 | Brewer | ................. | G11C 11/406 365/222 |
| 5,430,659 A * | 7/1995 | Miller | ....................... | H04J 3/14 327/145 |
| 5,754,764 A * | 5/1998 | Davis | .................... | G06F 13/385 709/200 |
| 5,870,595 A * | 2/1999 | Oki | ....................... | G06F 1/3228 713/601 |
| 5,918,061 A * | 6/1999 | Nikjou | ...................... | G06F 1/06 713/324 |
| 6,014,751 A * | 1/2000 | Kardach | ............... | G06F 1/3203 713/324 |

(Continued)

FOREIGN PATENT DOCUMENTS

| | | |
|---|---|---|
| CN | 1668130 A | 9/2005 |
| CN | 101504567 A | 8/2009 |

(Continued)

*Primary Examiner* — James M Perez
(74) *Attorney, Agent, or Firm* — Slater Matsil, LLP (57) ABSTRACT

An example relates to a method for accessing data of a first domain that is driven by a first clock via a second clock, comprising at least one of the following: accessing the data of the first domain via the second clock during a time when the first clock is in a first logical state. An edge indicating a transition from a second logical state to the first logical is used to access data via the first clock, or accessing the data of the first domain via the second clock at edges of the first clock that are synchronized with edges of the second clock.

22 Claims, 2 Drawing Sheets

(56) References Cited

U.S. PATENT DOCUMENTS

| | | | | |
|---|---|---|---|---|
| 6,163,583 A * | 12/2000 | Lin | G06F 1/08 | 375/354 |
| 6,263,448 B1 * | 7/2001 | Tsern | G06F 1/3225 | 712/E9.063 |
| 6,285,723 B1 * | 9/2001 | Yamada | G06F 1/04 | 327/229 |
| 6,304,979 B1 * | 10/2001 | Bacigalupo | G06F 1/10 | 713/322 |
| 6,564,040 B1 * | 5/2003 | Fujiwara | H04B 15/06 | 375/376 |
| 6,587,956 B1 * | 7/2003 | Hiratsuka | G06F 1/32 | 713/500 |
| 6,662,305 B1 * | 12/2003 | Salmon | G06F 1/12 | 370/503 |
| 6,684,342 B1 * | 1/2004 | Kelsey | G06F 1/3203 | 713/501 |
| 6,757,810 B1 * | 6/2004 | Takahashi | G06F 1/3203 | 712/200 |
| 6,763,471 B1 * | 7/2004 | Aoyama | G06F 1/08 | 713/320 |
| 6,813,217 B2 * | 11/2004 | Schneider | G11C 7/1078 | 365/194 |
| 6,877,087 B1 * | 4/2005 | Yamada | G06F 1/3203 | 712/226 |
| 7,000,140 B2 * | 2/2006 | Okubo | G06F 1/3203 | 713/601 |
| 7,062,587 B2 * | 6/2006 | Zaidi | G06F 15/7832 | 710/305 |
| 7,161,999 B2 * | 1/2007 | Parikh | G06F 5/06 | 327/141 |
| 7,170,819 B2 * | 1/2007 | Szczypinski | G11C 7/1066 | 365/189.05 |
| 7,184,360 B2 * | 2/2007 | Gregorius | G06F 13/4243 | 365/219 |
| 7,257,720 B2 * | 8/2007 | Ichien | G06F 1/3203 | 713/300 |
| 7,260,734 B2 * | 8/2007 | Labate | G06F 5/06 | 710/60 |
| 7,298,179 B2 * | 11/2007 | Lewis | G06F 1/08 | 327/34 |
| 7,325,152 B2 * | 1/2008 | Wallner | G11C 7/22 | 713/400 |
| 7,327,632 B2 * | 2/2008 | Beit-Grogger | G06F 13/4054 | 365/189.05 |
| 7,352,836 B1 * | 4/2008 | Mendenhall | G06F 5/06 | 370/304 |
| 7,362,837 B2 * | 4/2008 | Jaussi | H03L 7/0814 | 375/360 |
| 7,428,287 B2 * | 9/2008 | Holzle | G06F 1/10 | 375/372 |
| 7,466,773 B2 * | 12/2008 | Hansen | H03M 13/29 | 375/262 |
| 7,475,187 B2 * | 1/2009 | Gregorius | G11C 7/1006 | 711/104 |
| 7,499,516 B2 * | 3/2009 | Tripathi | H04L 25/14 | 375/354 |
| 7,599,456 B1 * | 10/2009 | Chi | H03F 3/217 | 370/232 |
| 7,624,286 B2 * | 11/2009 | Lin | G06F 1/3203 | 713/300 |
| 7,685,439 B2 * | 3/2010 | Drescher | G06F 1/3203 | 713/300 |
| 7,689,885 B2 * | 3/2010 | Kaibel | G01R 31/31854 | 714/726 |
| 7,710,801 B2 * | 5/2010 | Li | G01R 31/31855 | 365/201 |
| 7,885,367 B2 * | 2/2011 | Nishimura | H04L 7/048 | 327/144 |
| 7,970,086 B2 * | 6/2011 | Holmberg | H04L 7/0054 | 327/393 |
| 7,974,375 B2 * | 7/2011 | Kim | H03L 7/0891 | 327/235 |
| 8,014,440 B2 * | 9/2011 | Hsiao | H04L 7/0004 | 327/147 |
| 8,050,373 B2 * | 11/2011 | Buchwald | H04L 25/20 | 327/147 |
| 8,081,003 B2 * | 12/2011 | Pacha | G01R 31/3181 | 324/537 |
| 8,095,813 B2 * | 1/2012 | Pernia | G06F 1/3203 | 713/322 |
| 8,270,552 B1 * | 9/2012 | Oner | H04L 7/02 | 327/141 |
| 8,271,841 B2 * | 9/2012 | Li | G01R 31/31855 | 714/700 |
| 8,391,436 B2 * | 3/2013 | Higeta | H03K 5/1534 | 375/317 |
| 8,432,756 B1 * | 4/2013 | Sullivan | G11C 7/1075 | 365/189.14 |
| 8,660,489 B2 * | 2/2014 | Barrenscheen | G08C 17/06 | 455/41.2 |
| 8,681,912 B2 * | 3/2014 | Park | H04L 25/0228 | 375/232 |
| 8,751,833 B2 * | 6/2014 | Hill | G06F 1/3203 | 713/300 |
| 8,775,701 B1 * | 7/2014 | Fung | G06F 1/12 | 365/189.011 |
| 8,782,355 B1 * | 7/2014 | Jain | G06F 5/10 | 711/154 |
| 8,812,808 B2 * | 8/2014 | Eyerman | G06F 1/3203 | 711/167 |
| 8,826,058 B1 * | 9/2014 | Cox, Jr. | G06F 5/14 | 713/400 |
| 8,836,394 B2 * | 9/2014 | Zerbe | H04L 7/0079 | 327/161 |
| 8,847,604 B2 * | 9/2014 | Baumann | G01R 31/3181 | 324/537 |
| 8,942,336 B2 * | 1/2015 | Ghosh | H04L 27/0006 | 375/137 |
| 8,964,779 B2 * | 2/2015 | Barrenscheen | G05B 19/0421 | 370/465 |
| 9,110,646 B2 * | 8/2015 | Freibert | G06F 1/14 | |
| 9,258,032 B2 * | 2/2016 | Barrenscheen | G08C 17/06 | |
| 9,281,026 B2 * | 3/2016 | Felch | G06F 9/3851 | |
| 9,329,623 B2 * | 5/2016 | Vankayala | G06F 1/12 | |
| 9,330,741 B2 * | 5/2016 | Song | G11C 7/1093 | |
| 9,344,108 B2 * | 5/2016 | Hampel | H03M 3/506 | |
| 9,377,511 B2 * | 6/2016 | Li | G01R 31/31854 | |
| 9,565,036 B2 * | 2/2017 | Zerbe | H04L 25/0264 | |
| 9,652,356 B2 * | 5/2017 | Hanson | G06F 1/3206 | |
| 9,680,635 B2 * | 6/2017 | Hainz | H04L 7/0332 | |
| 9,742,549 B1 * | 8/2017 | Wang | H04J 3/0647 | |
| 9,748,960 B2 * | 8/2017 | Zerbe | H04L 7/0079 | |
| 10,158,349 B2 * | 12/2018 | Kargl | H03K 3/66 | |
| 2002/0176425 A1 * | 11/2002 | Aoki | H04L 12/40032 | 370/395.4 |
| 2004/0139362 A1 * | 7/2004 | Inaba | G06F 1/08 | 713/322 |
| 2004/0184573 A1 * | 9/2004 | Andersen | H03H 17/0621 | 375/372 |
| 2005/0254276 A1 * | 11/2005 | Beit-Grogger | G06F 13/4054 | 365/15 |
| 2006/0123260 A1 * | 6/2006 | Asada | G06F 1/3203 | 713/320 |
| 2006/0203603 A1 * | 9/2006 | Hellwig | H03L 7/06 | 365/194 |
| 2007/0001722 A1 * | 1/2007 | Young | H03L 7/081 | 327/156 |
| 2007/0245180 A1 * | 10/2007 | Li | G01R 31/31855 | 714/718 |
| 2008/0004831 A1 * | 1/2008 | Li | G01R 31/31855 | 702/119 |
| 2008/0005635 A1 * | 1/2008 | Kaibel | G01R 31/31854 | 714/731 |
| 2008/0079482 A1 * | 4/2008 | Hober | G06F 1/3203 | 327/544 |
| 2008/0104435 A1 * | 5/2008 | Pernia | G06F 1/3203 | 713/322 |

(56) References Cited

U.S. PATENT DOCUMENTS

| | | | | |
|---|---|---|---|---|
| 2009/0144587 | A1* | 6/2009 | Barrenscheen | G05B 19/0421 714/40 |
| 2009/0195079 | A1* | 8/2009 | Barrenscheen | H02J 7/0016 307/109 |
| 2009/0290596 | A1* | 11/2009 | Sticht | H04J 3/076 370/466 |
| 2010/0281309 | A1* | 11/2010 | Laurenti | G06F 11/3013 714/45 |
| 2011/0063931 | A1* | 3/2011 | Linann | G06F 13/1689 365/193 |
| 2011/0119522 | A1* | 5/2011 | Leussink | G06F 1/3203 713/600 |
| 2011/0189952 | A1* | 8/2011 | Barrenscheen | G08C 17/06 455/41.1 |
| 2011/0208987 | A1* | 8/2011 | Fujigaya | G06F 1/3237 713/323 |
| 2012/0260057 | A1* | 10/2012 | Eyerman | G06F 1/3203 711/167 |
| 2013/0067258 | A1* | 3/2013 | Furuya | G06F 1/3203 713/322 |
| 2013/0249612 | A1* | 9/2013 | Zerbe | H04L 7/0079 327/161 |
| 2013/0249713 | A1* | 9/2013 | Adelson | G06Q 10/0833 340/989 |
| 2013/0249719 | A1* | 9/2013 | Ryan | G06F 5/06 341/118 |
| 2014/0068305 | A1* | 3/2014 | Watanabe | G06F 1/3287 713/323 |
| 2014/0162552 | A1* | 6/2014 | Barrenscheen | G08C 17/06 455/41.1 |
| 2014/0347108 | A1* | 11/2014 | Zerbe | H04L 7/0079 327/158 |
| 2015/0078502 | A1* | 3/2015 | Sima | H04L 7/0331 375/376 |
| 2015/0089261 | A1* | 3/2015 | Segawa | G06F 1/3296 713/322 |
| 2016/0162001 | A1* | 6/2016 | Jung | G06F 1/324 |
| 2016/0179176 | A1* | 6/2016 | Kohara | G06F 1/3237 713/322 |
| 2017/0155497 | A1* | 6/2017 | Barrenscheen | H04L 7/0008 |
| 2017/0285718 | A1* | 10/2017 | Lai | G06F 1/324 |
| 2018/0083642 | A1* | 3/2018 | Zerbe | H04L 7/0079 |
| 2018/0164845 | A1* | 6/2018 | Christiansen | G06F 1/08 |
| 2019/0004563 | A1* | 1/2019 | Nelson | H03L 7/0807 |
| 2019/0004565 | A1* | 1/2019 | Nelson | H03L 7/0807 |
| 2019/0007052 | A1* | 1/2019 | Nelson | H03L 7/0807 |
| 2019/0007055 | A1* | 1/2019 | Nelson | H03L 7/0807 |

FOREIGN PATENT DOCUMENTS

| | | |
|---|---|---|
| CN | 201297255 Y | 8/2009 |
| CN | 102207922 A | 10/2011 |
| CN | 103324597 A | 9/2013 |
| EP | 1575178 A2 | 9/2005 |

* cited by examiner

ACCESSING DATA VIA DIFFERENT CLOCKS

TECHNICAL FIELD

Embodiments of the present invention in particular relate to an efficient access to data via different processing units, wherein each of the processing units may be driven by unsynchronized clocks.

SUMMARY

Embodiments of the invention all the access of data of a first domain using a first clock via a second domain using a second clock. The second clock may in particular operate at a higher frequency compared to the first clock.

A first embodiment relates to a method for accessing data of a first domain that is driven by a first clock via a second clock. The access to the data occurs with a defined phase-relation between the first clock and the second clock.

A second embodiment relates to a device for accessing data. A first domain comprises a first clock and at least one memory for storing the data, and a second domain comprises a second clock and a second processing unit. The first clock and the second clock are set to a defined phase-relation for accessing the data.

A third embodiment refers to a device for accessing data of a first domain that is driven by a first clock via a second clock. T first domain comprises a first clock and at least one memory for storing the data and a second domain comprising a second clock and a second processing unit. Means for setting the first clock and the second clock to a defined phase-relation for accessing the data are also provided.

A fourth embodiment is directed to a computer program product directly loadable into a memory of a digital processing device. The computer program product comprises software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF ILLUSTRATIVE EMBODIMENTS

In many control systems there is the need to save energy during a time when the activity of the control system is low. As a result, the system architecture is split into at least two domains. A second domain is used for operation of the control system in a normal mode in which the required functions, modules and computing performance operates at a high clock frequency; this is also referred to as the "fast domain" or "core domain". A first domain (also referred to as "slow domain" or "standby domain") may provide a reduced set of functions and may thus be clocked at a low frequency compared to the frequency of the second domain.

The first ("slow") domain may contain functional units (e.g., a timer, a communication interface, etc.) that operate at the lower frequency of this first domain. However, these functional units may be dedicated to continue operation while the second ("fast") domain is switched off for, e.g., power saving reasons. The functional units require configuration and control data from the processing unit of the second domain and may deliver status information to this processing unit.

In addition, if the second domain is configured to be switched off (e.g., powered down), the first domain may comprise a memory that is used for storing information that has to "survive" a power-down period of the second domain.

Data accesses (read or write) from the processing unit operating with the clock of the second domain may thus have to be handed over to the functional units or memory located in the first domain that are operating at the slower speed of the clock of the first domain.

In many architectures, the fast domain may enter a power saving state, wherein it is not clocked at all or even wherein its power supply is reduced or switched off. On the other hand, the slow (low power) domain (standby domain) may be operable (supplied and clocked) while the fast domain (core domain) is in such power saving state. Hence, the standby domain may have a clock generator that is independent from the clock generator of the (fast) core domain.

In many applications, the clock generator of the standby domain may operate at a frequency ranging from, e.g., 32 kHz to 200 kHz, whereas the core domain clock may operate in the MHz range, e.g., above 20 MHz.

During normal operation, i.e. when both domains are running, there may be a need for accessing registers or signals of the standby domain by a processing device (e.g., a central processing unit, CPU) that is located within the core domain. With each domain operating on its own, providing access to registers or signals referring to a different (asynchronous) clock domain may require synchronization. Such synchronization may be achieved by a synchronizer cell, which may comprise two D-Flip-Flops in series, which are clocked with the clock signal of the receiving domain.

In case of writing values from the core domain to registers of the standby domain or handing over signals from the core to the standby domain, a synchronization time, i.e. a time until the synchronized signals are visible in the receiving domain, may be considerably long (based on the lower clock rate of the standby domain). This time defines the reaction time of the receiving domain and also the access rate to it. In other words, the core domain cannot use its full speed to access the slower standby domain and has to wait until the slower domain has digested the previous access. Furthermore, depending on the amount of signals passing between the domains, the size of the synchronizer cells and their current consumption may become significant.

In case the core domain is switched off from time to time to reduce power consumption, the reaction time of the standby domain to write operations from the core domain may become a limiting factor, because the slow domain requires the fast domain to remain active significantly longer than needed which increases the overall power consumption.

According to an exemplary solution, many synchronizer cells in the data paths between the slow domain and the fast domain may be omitted by avoiding any access to information in the slow domain from the fast domain that could collide with the clock edge of the slow domain. In other words, the fast domain may access information of the slow domain in case the fast domain does not interfere with the clock edge used by the slow domain.

Hence, an access to information (read/write from fast domain or a data signal exchange between the domains) may only be endangered if it can collide with a clock edge of the slow domain.

An exemplary embodiment with now be described in the context of synchronous domains.

According to an exemplary embodiment, the slow domain is not clocked asynchronously to the fast domain. Hence, the slow domain is clocked with a clock signal that is synchronous to the clock signal of the fast domain but running at a different clock frequency.

If the slow domain is clocked with a clock signal that is synchronous to the clock signal of the fast domain, no synchronizer cells are required, because no collision may occur.

The "original" slow clock signal may hence not be used to actually clock the slow domain, but it may indicate when the slow domain would have been clocked. Hence, the slow clock signal can be synchronized to the fast clock and one clock cycle of the fast clock can be assigned to the slow clock domain. This can happen by cutting out one clock pulse of the fast clock and use this as clock pulse for the slow clock domain. This may result in both clock domains being synchronized, but running at different clock frequencies.

In case the slow clock domain has to be clocked by the original slow clock signal in a specific mode, e.g., in case the fast clock domain is switched off, a clock multiplexer can be used to select between the "original" asynchronous clock of the slow domain and the "cut out" synchronous clock from the fast domain. The clock multiplexer can be configured depending on the operation mode of the fast domain.

Figure 1:
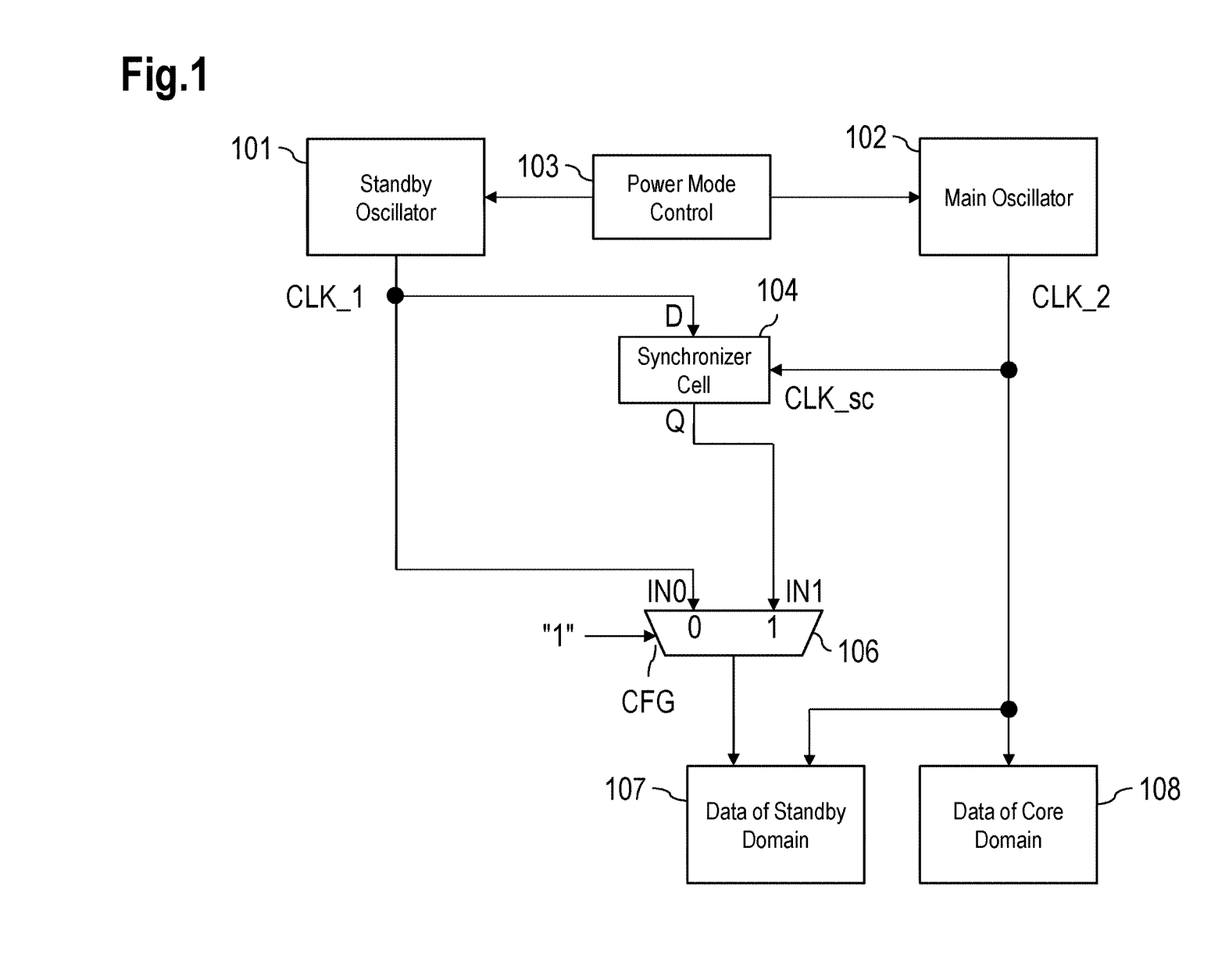
FIG. 1 shows a schematic block diagram comprising a standby oscillator providing a clock signal amounting to, e.g., 100 kHz and a main oscillator providing a clock signal amounting to, e.g., 66 MHz, wherein data of the first domain is accessible to the standby and the main oscillator.

FIG. 1 shows a schematic block diagram comprising a standby oscillator 101 providing a clock signal amounting to, e.g., 100 kHz and a main oscillator 102 providing a clock signal amounting to, e.g., 66 MHz. A power mode control unit 103 is provided to control the standby oscillator 101 and/or the main oscillator 102 depending on a mode of the device (e.g., standby mode, full power mode, etc.).

The standby oscillator 101 provides a clock signal CLK_1 at its output and the main oscillator 102 provides a clock signal CLK_2 at its output.

A synchronizer cell 104 is provided, which may comprise two D-Flip-Flops arranged in series. The synchronizer cell 104 has an input port D, and an output port Q and a clock port CLK_sc. The clock signal CLK_1 is conveyed to the input port D, the clock signal CLK_2 is conveyed to the clock port CLK_sc.

A multiplexer 106 has two inputs IN0 and IN1, an output OUT and a configuration input CFG. The configuration input CFG may be connected to a control unit (e.g., the power mode control unit 103 or a different control unit). The control unit connects the input IN0 to the output OUT by applying a signal "0" to the configuration input CFG. The control unit connects the input IN1 to the output OUT by applying a signal "1" to the configuration input CFG. The output port Q of the synchronizer cell 104 is connected to the input IN1, the clock signal CLK_1 is connected to the input IN0.

At the output OUT of the multiplexer 106 the following signals are provided:

If the configuration input CFG is 0, the standby domain is asynchronous to the core domain and the core domain can be switched off.

If the configuration input CFG is 1, the standby domain is synchronous to the core domain, the clock frequency of standby oscillator is used for accessing the data.

In this example, the standby domain is configured to run on the slow clock frequency.

Hence, by selecting the input IN1 of the multiplexer 106, the output Q of the synchronizer cell 104 is used to access the standby domain 107, wherein the standby oscillator output is synchronized to the main oscillator clock. In addition, the clock signal CLK_2 of the main oscillator 102 can also be used to access the standby domain 107 (and the core domain 108), because the clock of the main oscillator 102 is synchronized with the clock of the standby oscillator 101 via the synchronizer cell 104.

If the main oscillator is switched off, the input IN0 of the multiplexer 106 may be selected to access the standby domain 107 via the standby oscillator 101.

Another exemplary embodiment will now be described in the context of asynchronous domains.

According to another example, the fast domain may access information of the asynchronously clocked slow domain when the slow domain is not able to "see" a clock pulse of the fast domain. In such case, there is no risk of data corruption.

If, for example, the slow clock domain is susceptive to rising edges of its clock, the fast domain may access data in the slow clock domain while the clock of the slow domain is at high level (logical "1"). Only if the clock of the slow clock domain is at low level (logical "0"), a rising edge can occur in the "near future" and may thus interfere with a pulse of the fast clock domain.

Figure 2:
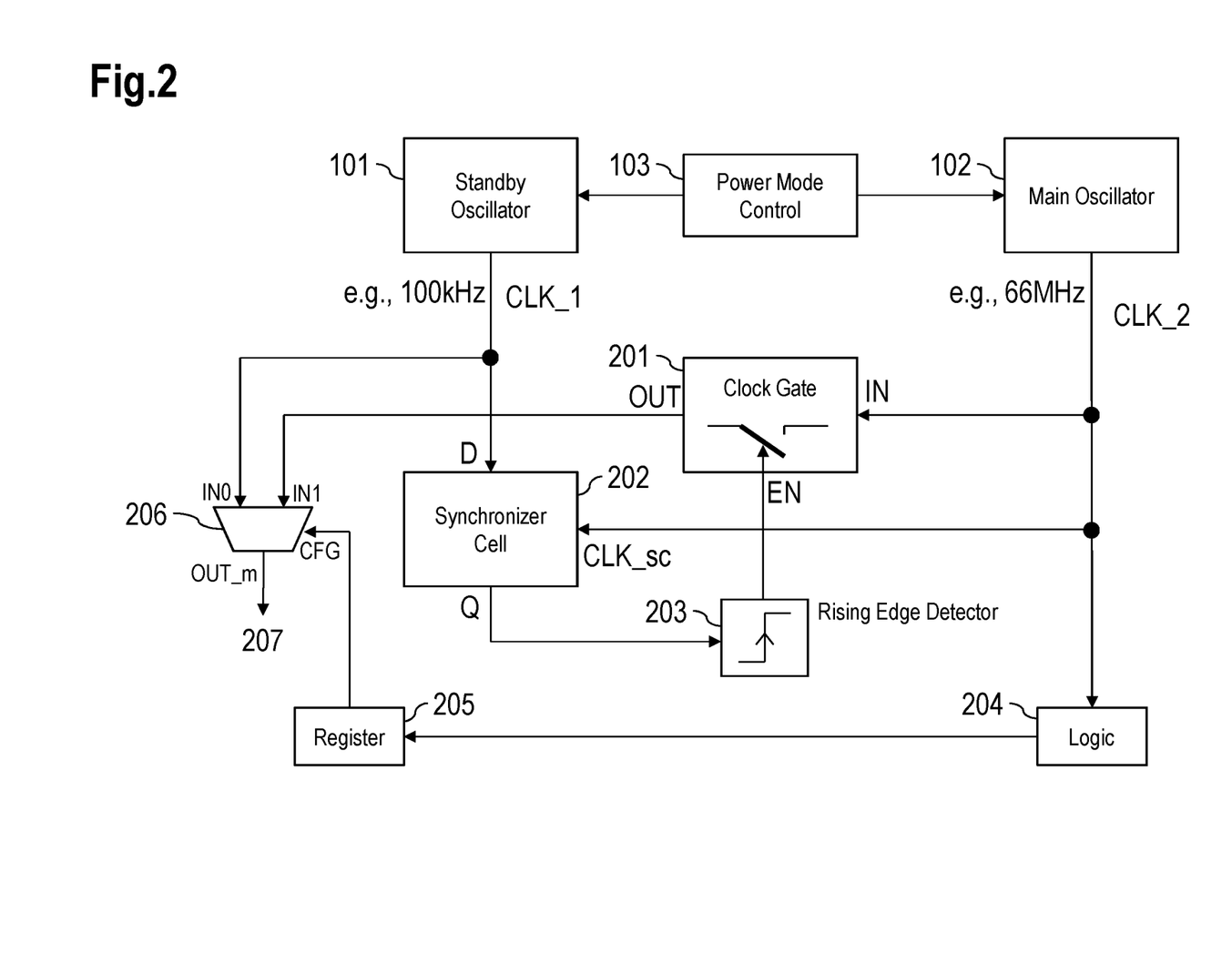
FIG. 2 shows a schematic diagram of an alternative embodiment to efficiently access data of the first domain via both oscillators.

FIG. 2 shows a schematic diagram comprising the standby oscillator 101 providing a clock signal amounting to, e.g., 100 kHz and the main oscillator 102 providing a clock signal amounting to, e.g., 66 MHz. The power mode control unit 103 is provided to control the standby oscillator 101 and/or the main oscillator 102 depending on a mode of the device (e.g., standby mode, full power mode, etc.). Also, a clock gate 201, a synchronizer cell 202, a rising edge detector 203, a logic 204, a register 205 and a multiplexer 206 are shown.

The standby oscillator 101 provides a clock signal CLK_1 at its output and the main oscillator 102 provides a clock signal CLK_2 at its output.

The clock gate 201 has a clock input port IN to which the clock signal CLK_2 is connected. Also, the clock gate 201 has a enable port EN and an output port OUT. A clock pulse at its input IN is forwarded to the output OUT only if the enable port EN is set to "1"; if the enable port EN is set to "0", the output OUT of the clock gate 201 stays at an idle level, e.g., "0".

The standby oscillator 101 and the main oscillator 102 are connected to the synchronizer cell 202.

The synchronizer cell 202 may comprise two D-Flip-Flops arranged in series. The synchronizer cell 202 has an input port D, and an output port Q and a clock port CLK_sc. The clock signal CLK_1 is conveyed to the input port D, the clock signal CLK_2 is conveyed to the clock port CLK_sc. The output Q of the synchronizer cell 202 is fed to the rising edge detector 203 and the rising edge detector's output is connected to the enable port EN of the clock gate 201.

The clock gate 201 passes the clock pulses CLK_2 from the main oscillator 102 to the multiplexer 206 if its enable port EN which is fed by the rising edge detector 203 is "1". This happens in case a rising edge is detected in the signal of the standby oscillator 101 by the rising edge detector 203.

The multiplexer 206 has two inputs IN0 and IN1, an output OUT_m and a configuration input CFG. The configuration input CFG may be connected to a control unit (e.g., the power mode control unit 103 or a different control unit). The control unit connects the input IN0 to the output OUT by applying a signal "0" to the configuration input CFG. The control unit connects the input IN1 to the output OUT by applying a signal "1" to the configuration input CFG. The input IN0 is connected to the clock signal CLK_1 and the input IN1 is connected to the output OUT of the clock gate 201

A clock pulse 207 is provided at the output OUT_m of the multiplexer 206 for accessing data of the standby domain. At the output OUT_m the following signals are provided:

If the configuration input CFG is 0, the clock pulse 207 corresponds to the clock signal CLK_1 of the standby oscillator 101.

If the configuration input CFG is 1, the clock pulse 207 corresponds to one clock pulse that is cut out of the clock signal CLK_2 of the main oscillator 102 when the clock signal CLK_1 of the standby oscillator 101 has indicated a rising edge. The information of such rising edge is made available to the enable input EN of the clock gate 201 via the rising edge detector 203 (which is operating synchronously to the core domain) and the synchronizer cell 202. Similar to the output Q of synchronizer cell 104 of FIG. 1, the synchronized standby clock signal delivers the information about the phase of the standby clock to the core domain The main oscillator 102 may provide its signal to the logic 204, which via a register 205 is able to set the multiplexer 206 to use the standby oscillator signal or the signal from the clock gate 201 at its output.

The solution presented bears the advantage that a reduced chip area is required leading also to a reduced amount of power. Further, the access rate to the slow domain by the fast domain is significantly increased, because the fast domain does no longer need to wait until the slow domain has "seen" the information.

For both embodiments A and B, the "original" clock signal of the slow domain is synchronized to the fast domain and can be used there. According to embodiment A, a rising edge of this signal can lead to a clock pulse delivered by the fast domain to the slow domain. In embodiment B, the software can read the status of this clock signal of the slow domain and can wait for a logical "1" level before issuing a read or a write command.

As an option, the software may not accept a higher priority interrupt between the read of the synchronized signal and the read/write access that can last longer than the logical "0" level phase of the synchronized signal (minus some margin).

It is an option that the information about a change in the logical level of the synchronized signal is forwarded to the core domain. There, the access to data of the standby domain may be scheduled on the logical level of the synchronized signal.

It is another option that access to data of the standby domain is scheduled based on a timing window starting with the change of the logical level. In such scenario, a timing window is set, which ends before the next relevant change of the logical state of the slow clock signal.

It is in particular an advantage of the solution provided herein that only the clock signal may be synchronized, e.g., by replacing one clock signal with another clock signal, which may be generated based on an asynchronous clock signal. Hence, instead of synchronizing a multitude of data lines, which leads to high current consumption, requires additional space and results in delay, synchronizing the clock signal is a more efficient approach.

The examples suggested herein may in particular be based on at least one of the following solutions. In particular combinations of the following features could be utilized in order to reach a desired result. The features of the method could be combined with any feature(s) of the device, apparatus or system or vice versa.

A method is provided for accessing data of a first domain that is driven by a first clock via a second clock, wherein the access to the data occurs with a defined phase-relation between the first clock and the second clock.

A defined phase-relation is in particular after an edge of the slow clock or while the slow clock shows a stable or defined logical state or level.

Each clock may comprise two logical levels, i.e. a first logical level and a second logical level, wherein a transition between the logical levels may occur at a given time or rate. The transition between the logical levels may be a rising edge or a falling edge.

Accessing data may comprise: a read access, a write access, a generation of value, an access on a register, an access to a timer, etc.

The solution presented bears the advantage that a collision-free access to the data of the first domain is achieved via the second (fast) clock.

The solution provided in particular enables an efficient access to data stored in a first domain (that is usually operated by the first clock at a lower frequency) via a second clock (operating at a higher frequency compared to the frequency of the first clock).

No bulky and energy consuming synchronization is required. Instead, the access to the data can be achieved (e.g., via a processor utilizing the second clock operating at the second—high—frequency) in a way that the first clock and the second clock do not interfere. This may be achieved by synchronizing the edges of the second clock (fast clock) that may be used for timer operations of the first clock (slow clock).

It is noted that the "first clock" can be regarded as "first clock signal" and the "second clock" can be regarded as "second clock signal". Hence, the first clock signal and the second clock signal may be synchronized for accessing the data.

It is noted that "accessing the data" via a clock may refer to a processing unit, e.g., a controller or processor that is driven by such clock (at the frequency the oscillator provides resulting in a clock signal) and data access may be provided by the processing unit on the basis of the clock. The faster the clock, the faster the overall operation of the processing unit and vice versa. The processing unit may utilize edges (e.g., rising and/or falling edges) of the clock (signal) to conduct access to the data. Access to the data may include at least one of the following: writing, erasing, copying, reading, verifying data.

The term "domain" may refer to a device, a part of a device, an arrangement or a circuitry which may in particular comprise a processing unit which is arranged to operate at the frequency of the clock which is associated with this domain. The domain may also comprise at least one memory (e.g., memory device, register, external hardware, internal hardware, etc.) comprising data that is accessible to the processing unit of the respective domain. The approach presented herein allows accessing such data via different domains, the first domain that comprises the data and the second domain, which may have a second processing unit utilizing a second clock with a second frequency.

In an embodiment, the first clock is asynchronous to the second clock.

In an embodiment, the first clock has a lower frequency than the second clock.

It is noted that the frequency of the second clock can be significantly higher than the frequency of the first clock. For example, the frequency of the first clock may be in the order of kilohertz, e.g., around 100 kHz, and the frequency of the second clock may be in the order of several megahertz, e.g., 50 MHz or more.

In an embodiment, the first clock has a first periodic time and the second clock has a second periodic time, the first periodic time comprises first time interval of a first logical level and second time interval of a second logical level, the first time interval is larger than the second periodic time and the second time interval is larger than the periodic time of the second clock.

The first time interval may be an on portion and the second time interval may be an off portion or vice versa.

In an embodiment, the second clock determines an access to data of a second domain or a fast access to data of the first domain.

In an embodiment, the first clock is enabled while the second clock is at least temporarily disabled.

Clock enabled means the clock shows edges according to a defined timing from a first logical level to a second logical level and vice versa. Clock disabled means the clock signal stays at a defined level. In a low power mode, the second clock can be at least temporarily disabled for power saving reasons.

In an embodiment, the first domain comprises at least one processing unit driven by the first clock and at least one memory which is accessible to the at least one processing unit.

The memory may comprise any kind of memory, e.g., a memory chip, a register, a hard-disc, etc.

In an embodiment, a second domain comprises at least one processing unit driven by the second clock, which is arranged to access the memory of the first domain.

In an embodiment, the data of the first domain are stored within the at least one memory.

In an embodiment, the first clock is used for accessing the data of the first domain in case the second clock is switched off.

In an embodiment, based on the first clock, a cycle of the second clock is determined, wherein the cycle of the second clock is used for accessing the data of the first domain.

The cycle may be any portion of the second clock, e.g., a rising edge, a falling edge, a pulse, which may serve as a basis for accessing the data of the first domain. The slow first clock may hence provide a window (e.g., after a rising edge of the first clock signal until a subsequent falling edge of the first clock signal) during which a, e.g., rising edge of the second clock can be selected to access the data of the first domain. Hence, this rising edge of the second clock (which occurs at some point during an on-phase of the first clock) is used for accessing the data of the first domain. The edges of the first clock may hence be asynchronous to the edges of the second clock; nevertheless access to the data of the first domain is achieved to happen synchronously with the second clock.

It is noted that the first, second, or n-th rising edge of the second clock may be selected after the rising edge of the first clock occurred.

Hence, every edge of the first (slow) clock may be used to start a selection of an edge of the second clock. After the edge of the first clock a window starts until the opposite edge of the first clock. This window may determine a duration for selecting (at least) one edge of the second clock for accessing the data of the first domain. Within this duration no conflict between edges of the first clock and the second clock may occur, because the first clock signal is either on a first level or on a second level and is not going to change for the duration of this window.

Therefore, the second clock can successfully be used to access (e.g., read and/or write) data of the first domain. The second clock does not have to wait for a corresponding edge of the first clock, which may appear rather rarely with regard to the high frequency of the second clock. Instead, the edges of the second clock (within the duration defined above) can be used to access the data of the first domain.

In an embodiment, an edge of the first clock or a level of the first clock is used for selecting at least one edge of the second clock.

The first (slow) clock signal may hence not be used to actually clock the slow domain, but it may indicate when the slow domain is to be clocked. Hence, the slow clock signal can be synchronized based on the fast clock and one clock cycle of the fast clock can be assigned to the slow clock domain. This can happen by cutting out one clock pulse of the fast clock and use this as clock pulse for accessing the slow clock domain. This may result in both clock domains being synchronized.

In an embodiment, the edge may be a rising edge or a falling edge.

In an embodiment, the method further comprises accessing the data of the first domain via the second clock during a time when the first clock has changed from a second logical state to a first logical state. The data of the first domain are accessed via the second clock after a predetermined amount of time after the change from the second logical state to the first logical state has been detected.

In an embodiment, the first logical state corresponds to logical "0" and the second logical state corresponds to logical "1" or vice versa.

Synchronizing edges of the first clock to a part of the edges issued by the second clock avoids any collision and malfunction. Synchronization in this regard also refers to as "masking", "filtering" or "selecting". Hence, the first clock signal may trigger a criterion for selecting (at least) one edge of the second clock signal. Also, the access to data may be conducted using the second clock during a time when an edge of the first clock that could be subject to a data access (based on the first clock) just passed and the logical state has not yet reverted to provide another edge of the same type (e.g., another falling edge or another rising edge, depending on the use case scenario). In other words, if the current logical state of the first clock does not allow for an edge that is subject to an access operation on the data, the second clock can be used for access the data of the first domain without the risk of a collision. However, if the current logical state of the first clock signal is the one for an effective edge (i.e. for an effective data access) to occur, the second clock may not be used for accessing the data. Instead, the transition of the effective edge has to be awaited before accessing the data via the second clock.

Also, a device for accessing data is provided. The device comprises a first domain comprising a first clock and at least one memory for storing the data, and a second domain comprising a second clock and a second processing unit. The first clock and the second clock are set to a defined phase-relation for accessing the data.

In an embodiment, the first clock operates at a lower frequency than the second clock.

In an embodiment, the first clock has a first periodic time and the second clock has a second periodic time, the first periodic time comprises a first time interval of a first logical level and a second time interval of a second logical level, the first time interval is larger than the second periodic time and the second time interval is larger than the periodic time of the second clock.

In an embodiment, the second processing unit is arranged for, based on the first clock, determining a cycle of the second clock, where the cycle of the second clock is used for accessing the data of the first domain.

In an embodiment, the second processing unit is arranged for accessing the data of the first domain via the second clock during a time after the first clock has changed from a second logical state to a first logical state. The data of the first domain are accessed via the second clock after a predetermined amount of time after the change from the second logical state to the first logical state has been detected.

In an embodiment, the first domain further comprises at least one first processing unit and wherein the second processing unit is part of the second domain.

In an embodiment, the first domain is a standby domain and the second domain is a core domain, wherein the second clock operates at a higher frequency than the first clock.

In an embodiment, the first clock is enabled while the second clock is at least temporarily disabled.

Further, a device is suggested for accessing data of a first domain that is driven by a first clock via a second clock. The device comprises a first domain comprising a first clock and at least one memory for storing the data, and a second domain comprising a second clock and a second processing unit. The device also includes means for setting the first clock and the second clock to a defined phase-relation for accessing the data.

A computer program product is provided, which is directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of inter-operative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A method comprising:
   accessing data of a first domain that is driven by a first clock via a second clock; and
   synchronizing the first clock and the second clock to produce a defined phase-relation between the first clock and the second clock when accessing the data of the first domain, wherein the first domain comprises a processing unit driven by the first clock and a memory that is accessible to the processing unit, a second domain comprises a second processing unit driven by the second clock, and the second processing unit is arranged to access the memory of the first domain.

2. The method according to claim 1, wherein the first clock is asynchronous to the second clock.

3. The method according to claim 1, wherein the first clock has a lower frequency than the second clock.

4. The method according to claim 3,
   wherein the first clock has a first periodic time and the second clock has a second periodic time;
   wherein the first periodic time comprises first time interval of a first logical level and second time interval of a second logical level;
   wherein the first time interval is larger than the second periodic time; and
   wherein the second time interval is larger than the second periodic time of the second clock.

5. The method according to claim 1, wherein the second clock determines an access to data of the second domain or a fast access to data of the first domain.

6. The method according to claim 1, wherein the first clock is enabled while the second clock is disabled.

7. The method according to claim 1, wherein the data of the first domain are stored within the memory.

8. The method according to claim 1, wherein the first clock is used for accessing the data of the first domain in case the second clock is switched off.

9. The method according to claim 1, wherein, based on the first clock, a cycle of the second clock is determined, wherein the cycle of the second clock is used for accessing the data of the first domain.

10. The method according to claim 9, wherein an edge of the first clock or a level of the first clock is used for selecting an edge of the second clock.

11. The method according to claim 10, wherein the edge is a rising edge.

12. The method according to claim 1, further comprising accessing the data of the first domain via the second clock during a time when the first clock has changed from a second logical state to a first logical state, wherein the data of the first domain are accessed via the second clock after a predetermined amount of time after the first clock has changed from the second logical state to the first logical state.

13. The method according to claim 12, wherein the first logical state corresponds to logical "0" and the second logical state corresponds to logical "1" or vice versa.

14. A non-transitory computer readable medium having computer-executable instructions stored thereon, that when executed by a digital processing device cause the digital processing device to perform the steps of the method according to claim 1.

15. A device comprising:
    a first domain comprising first clock circuit configured to generate a first clock signal and a memory configured to store data to be accessed;
    a second domain comprising a second clock circuit configured to generate a second clock signal and a second processing unit, the second processing unit coupled to the memory; and
    a synchronizer circuit coupled to the first clock circuit and the second clock circuit, the synchronizer circuit configured to synchronize the first clock signal and the second clock signal to have a defined phase-relation for accessing the data, wherein the first domain is a standby domain and the second domain is a core domain, wherein the second clock signal operates at a higher frequency than the first clock signal.

16. The device according to claim 15, wherein the first clock signal operates at a lower frequency than the second clock signal.

17. The device according to claim 16,
    wherein the first clock signal has a first periodic time and the second clock signal has a second periodic time;
    wherein the first periodic time comprises a first time interval of a first logical level and a second time interval of a second logical level;
    wherein the first time interval is larger than the second periodic time; and
    wherein the second time interval is larger than the second periodic time of the second clock signal.

18. The device according to claim 15, wherein the second processing unit is configured to determine a cycle of the second clock signal based on the first clock signal, wherein the cycle of the second clock signal is used for accessing the data in the memory of the first domain.

19. The device according to claim 15, wherein the second processing unit is configured to access the data of the first domain via the second clock signal during a time after the first clock signal has changed from a second logical state to a first logical state; and
    wherein the data of the first domain are accessed via the second clock signal a predetermined amount of time after the first clock signal has changed from the second logical state to the first logical state.

20. The device according to claim 15, wherein the first domain further comprises a first processing unit.

21. The device according to claim 15, wherein the first clock signal is enabled while the second clock signal is disabled.

22. A device for accessing data that is driven by a first clock via a second clock, the device comprising:
    a first domain comprising the first clock and a memory for storing the data;
    a second domain comprising the second clock and a second processing unit; and
    means for setting the first clock and the second clock to a defined phase-relation for accessing the data, wherein the first clock is used for accessing the data of the first domain in case the second clock is switched off.

* * * * *